United States Patent
Sikotra et al.

(10) Patent No.: US 10,137,923 B2
(45) Date of Patent: Nov. 27, 2018

(54) STEERING COLUMN ASSEMBLY (71) Applicant: TRW Limited, Solihull, West Midlands (GB)

(72) Inventors: Rajendra Gopalji Sikotra, Leicester (GB); Michael Appleyard, Cheltenham (GB); Bohumír Sýkora, Nové Veselí (CZ)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 15/315,932

(22) PCT Filed: May 28, 2015

(86) PCT No.: PCT/GB2015/051548
§ 371 (c)(1),
(2) Date: Dec. 2, 2016

(87) PCT Pub. No.: WO2015/185892
PCT Pub. Date: Dec. 10, 2015

(65) Prior Publication Data
US 2017/0088159 A1 Mar. 30, 2017

(30) Foreign Application Priority Data
Jun. 2, 2014 (GB) .................................. 1409768.7

(51) Int. Cl.
*B62D 1/184* (2006.01)
*B62D 1/19* (2006.01)
(Continued)

(52) U.S. Cl.
CPC ............. *B62D 1/184* (2013.01); *B62D 1/185* (2013.01); *B62D 1/187* (2013.01); *B62D 1/192* (2013.01)

(58) Field of Classification Search
CPC ........ B62D 1/184; B62D 1/185; B62D 1/187; B62D 1/192
See application file for complete search history.

(56) References Cited

U.S. PATENT DOCUMENTS

| 5,064,219 A | 11/1991 | Schaible et al. |
| 6,244,128 B1 | 6/2001 | Spancer et al. |
| (Continued) | | |

FOREIGN PATENT DOCUMENTS

| EP | 0411312 A1 | 2/1991 |
| EP | 0611690 A1 | 8/1994 |
| (Continued) | | |

OTHER PUBLICATIONS

Patent Act 1977: Search Report under Section 17(5), Application No. GB1409768.7 dated Dec. 3, 2014.
(Continued)

*Primary Examiner* — Drew J Brown
(74) *Attorney, Agent, or Firm* — MacMillan, Sobanski & Todd, LLC (57) ABSTRACT

A steering column assembly comprises a telescopic shroud having an upper shroud portion and a lower shroud portion, a support bracket having at least one arm which extends down from the bracket on one side of the lower shroud portion, a clamp mechanism which comprises a clamp pin that passes through an opening in the arm and an opening in the lower shroud portion or an opening in a rail secured to the lower shroud portion, the clamp mechanism further comprising a primary cam mechanism which is operable by a lever, whereby the clamp mechanism is arranged so that when in the clamped condition the at least one arm is clamped to the lower shroud portion or rail and the lower shroud portion is squeezed onto the upper shroud portion to fix the upper shroud portion relative to the lower shroud portion. The assembly further comprises a release mecha-
(Continued)

nism such as a cam mechanism which is operable to partially reduce the force with which the outer shroud portion is squeezed onto the inner shroud portion in the event of a crash.

15 Claims, 4 Drawing Sheets

(51) Int. Cl.
*B62D 1/185* (2006.01)
*B62D 1/187* (2006.01)

(56) References Cited

U.S. PATENT DOCUMENTS

| | | |
|---|---|---|
| 2007/0137377 A1 | 6/2007 | Kamei |
| 2011/0239808 A1 | 10/2011 | Schnitzer |

FOREIGN PATENT DOCUMENTS

| | | |
|---|---|---|
| EP | 1464560 A2 | 10/2004 |
| GB | 2244032 A | 11/1991 |
| JP | 2005138758 A | 6/2005 |
| JP | 2007038833 A | 2/2007 |
| JP | 2008308072 A | 12/2008 |
| WO | 2004087483 A2 | 10/2004 |
| WO | 2012168689 A1 | 12/2012 |

OTHER PUBLICATIONS

PCT International Search Report and the Written Opinion, Application No. PCT/GB2015/051548 filed May 28, 2015, dated Aug. 31, 2015.

STEERING COLUMN ASSEMBLY

CROSS-REFERENCE TO RELATED APPLICATIONS

This application is a national stage of International Application No. PCT/GB2015/051548, filed 28 May 2015, the disclosures of which are incorporated herein by reference in entirety, and which claimed priority to Great Britain Patent Application No. 1409768.7, filed 2 Jun. 2014, the disclosures of which are incorporated herein by reference in entirety.

BACKGROUND OF THE INVENTION

This invention relates to improvements in steering column assemblies.

It is known to provide a steering column for a vehicle in which a steering column shaft is supported within a telescopic shroud that is fixed to the body of the vehicle, usually to a beam located behind the dashboard. The steering column shaft protrudes from one end of the shroud and is connected to a steering wheel that the driver can turn to rotate the shaft and hence steer the vehicle. The steering column shaft is typically connects to the road wheels through gearbox and an electric motor may be provided which provides useful torque that assists the driver in turning the steering wheel. The telescopic shroud permits adjustment of the position of the wheel relative to the driver. The position may be adjusted for reach by allowing, in an unclamped condition, for one part of the shroud to telescope over or into another part of the shroud. In many cases the steering column assembly will also allow adjustment for rake in the unclamped condition by allowing the whole shroud to be moved relative to the body of the vehicle. This is typically achieved by the shroud pivoting about a pivot axis located some distance from the steering wheel.

There are two basic types of telescopic or so-called "Tube-in-Tube" steering column assemblies. This invention relates to the type known as a "Cantilever" or "Inverted" Tube-in-Tube type in which the shroud comprises a hollow outer part, typically a tube, that slides over a hollow inner part, also typically a tube, within which the steering column shaft is supported. The inner tube is located nearest the steering wheel and is the one that moves for reach, sliding into the outer Tube that is secured to the vehicle body further away from the steering wheel. The outer tube typically cannot move axially but can pivot around a pivot axis. The inner tube can move during adjustment when the assembly is an unclamped condition. The inner tube should also be able to move axially during a crash, even when the assembly is in a clamped condition, and this movement is typically resisted by an energy absorbing mechanism to control the collapse of the steering column assembly.

BRIEF SUMMARY OF THE INVENTION

According to a first aspect the invention provides a steering column assembly comprising:
  a telescopic shroud having an upper shroud portion and a lower shroud portion, in which at least part of the upper shroud portion is telescopically received within the lower shroud portion,
  a support bracket which in use is secured to a fixed part of the vehicle, the bracket having at least one arm which extends down from the bracket on one side of the lower shroud portion,
  a clamp mechanism which comprises a clamp pin that passes through an opening in the arm and an opening in the lower shroud portion or an opening in a rail secured to the lower shroud portion,
  the clamp mechanism further comprising a primary cam mechanism which is operable by a lever between an unclamped condition of the clamp mechanism in which the primary cam mechanism has a first length and a clamped condition in which the primary cam mechanism has a second, longer, length, whereby the clamp mechanism is arranged so that when in the clamped condition the at least one arm is clamped to the lower shroud portion or rail and the lower portion is squeezed onto the upper portion to fix the upper shroud portion relative to the lower shroud portion,
  characterised by further comprising a release mechanism which is operable to partially reduce the force with which the outer shroud portion is squeezed onto the inner shroud portion in the event of a crash that causes the upper portion to move into the lower portion whilst the clamp mechanism remains in the clamped position.

Providing a release mechanism enables the clamp force of the clamp mechanism to be partially, but not totally, released so that it does not interfere with the collapse of the shroud during a crash. If the force was not released the controlled movement of the upper shroud portion into the lower shroud portion would be inhibited by the clamp force. The invention provides a means for removing, or substantially reducing, at the initiation of column collapse in crash, the tube-to-tube friction which is present due to the operation the clamping lever and cam mechanism.

The opening in the arm through which the clamp pin of the primary clamp mechanism passes may comprise an elongate slot that extends generally vertically, movement of the clamp pin up or down along the slot when in the unclamped condition permitting rake adjustment of the assembly.

The clamp mechanism may include one or more teeth secured to the bracket and one or more teeth that are moved by the clamp mechanism into and out of engagement with those teeth when in the clamped or unclamped condition respectively to provide positive locking, the release mechanism releasing the clamping of the outer shroud portion to the inner tube portion but maintaining the teeth at least partially in engagement so as to retain the positive locking when released.

The clamp mechanism may include a toothed block that is threaded onto the clamp pin so that in an unclamped position the is block held clear of a set of teeth on the arm of the bracket or on the lower shroud or the rail, the teethed of the block and the set of teeth being interengaged when the clamp mechanism is in the clamped condition, and in which the release mechanism in use only releases the clamp force applied by the clamp mechanism enough to partially reduce the clamp force yet keep the toothed teeth of the block at least partially engaged with the set of teeth.

This ensures that whilst the clamp force is released sufficient that the outer shroud portion relaxes its grip on the inner shroud portion, the rake position of the steering assembly is retained because the teeth are still interengaged, preventing uncontrolled rake movement of the overall shroud relative to the vehicle. This helps manage the collapse energy during a crash.

The release mechanism may comprise a secondary cam mechanism that is located in series along the clamp pin with the primary cam mechanism, the cam mechanism being operable between a normal position in which it has a first length and a released position in which it has a second, shorter, length, the difference in length being less than the height of the teeth of the toothed block or set of teeth.

The amount by which the clamp force will be released will be dependent, at least in part, on the change in length of the secondary cam mechanism between the normal position and the release position, and the resilience of the parts of the assembly such as the clamp pin, arms, outer shroud portion etc.

The secondary cam mechanism may be located between the primary cam mechanism and the arm of the support bracket. The primary cam mechanism may therefore squeeze the secondary cam mechanism onto the arm.

The secondary cam mechanism may comprise a fixed cam portion and a moving cam portion, each threaded onto the clamp pin, the moving cam portion rotating between the normal and release position to alter the length of the secondary cam. By fixed we mean that the cam portion cannot rotate but is free to move axially along the clamp pin. By moving we mean that the cam portion can rotate but cannot move axially along the clamp pin. Rotation may be prevented by engagement of the cam portion with another part of the clamp assembly.

The fixed cam portion of the secondary cam and the fixed cam portion of the primary cam mechanism may be combined as a single part.

The moving cam portion of the secondary cam mechanism (the one that moves axially) may be connected to the upper shroud portion through an actuating mechanism such that movement of the upper shroud portion relative to the lower shroud portion causes movement of the actuating mechanism and in turn the rotational movement of the secondary cam mechanism to the release condition.

The actuating mechanism may include an extension arm that projects from the moving portion of the secondary cam mechanism, the extension arm rotating around the axis of the clamp pin to cause rotation of the moving cam portion.

The actuating mechanism may include a carrier that is connected to the extension arm and is located within an opening in the lower shroud portion through which a reach locking device extends that engages the upper shroud portion when the steering column assembly is in the clamped condition, the carrier being arranged so that it can move relative to the opening when a force is applied to the locking device in a direction parallel to the telescopic movement of the shroud that exceeds a predefined value, thereby creating movement of the extension arm that in turn releases the release mechanism.

The carrier may be located in the opening by one or more deformable or frangible connectors that resist movement of the carrier relative to the opening until the predefined force is applied that deforms or breaks the connectors.

The reach locking device may be arranged so that it is spaced apart from the upper shroud portion when the clamp mechanism is in the unclamped condition and may engage the upper shroud portion when the clamp mechanism is in the clamped condition. This allows the upper portion to move relative to the lower portion during adjustment without damage to the carrier or the frangible fastener.

The reach locking device may therefore be actuated directly by the clamp mechanism.

The reach locking device may comprise a rod that passes through an opening in the carrier and thereby through the opening in the lower shroud portion, the rod being free to slide within the opening in the carrier so that it can move axially in response to movement of the fixed portion of the primary clamp mechanism along the axis of the clamp pin.

In one preferred arrangement, an end of the rod may be fixed to an extension of the fixed cam portion of the primary cam mechanism that may extend generally radially away from the axis of the clamp pin, or may be connected to the clamp lever or to some other part that moves axially along the clamp pin during clamping. The axis of the rod and axis of the clamp pin may therefore by parallel to each other.

The carrier and rod may be located below the arm of the support bracket so that the rod does not pass through an opening in the support bracket, only an opening in the lower shroud portion. The axis of the rod will therefore be offset from the axis of the The rod may carry a block on its end nearest the upper shroud portion which has a set of teeth that can engage complimentary set of teeth of a reach tooth plate that is secured to the upper shroud portion.

The teeth provide for a positive lock of the steering column assembly for reach, any force applied to the upper shroud portion along its axis being passed through the rod to the carrier and in turn to the lower shroud portion through the carrier. This is normally reacted by the frangible pin, but if it is enough to break this a small movement of the carrier will occur. Eventually this movement is reacted by the side wall of the opening in the upper shroud portion so that no further movement of the rod can occur.

The carrier may be arranged so that it is free to move only a small distance following breaking of the frangible connector until it is prevented from further movement by the side wall or walls of the opening in the upper shroud portion. The carrier may therefore be fitted in an oversized opening.

The reach tooth plate may be secured to the upper shroud portion by a rail along which it can slide and an energy absorbing mechanism that connects the plate to the upper shroud portion that is arranged to deform in the event of a crash to permit the plate to move relative to the upper shroud, the movement of the plate relative to the lower shroud portion being restrained during a crash by the toothed head and pin to which it is attached that are reacted by the carrier in the opening in the lower shroud portion.

The energy absorbing member may be arranged so that the force required to initially deform it is greater than that required to break the frangible fastener or otherwise deform the carrier.

The support bracket most preferably has two arms, one each side of the lower shroud portion so that the bracket is U-shaped, and the clamp pin passes through a slot in each of the arms, the two arms being squeezed onto the outer shroud portion when clamped in turn to squeeze the outer shroud portion onto the inner shroud portion.

The clamp pin may be provided with a fixed or adjustable head at each end.

Other advantages of this invention will become apparent to those skilled in the art from the following detailed description of the preferred embodiments, when read in light of the accompanying drawings.

BRIEF DESCRIPTION OF THE DRAWINGS

FIG. 6(a) to (c) show parts of the primary cam mechanism and the secondary cam mechanism of the assembly of FIG. 3;

DETAILED DESCRIPTION OF THE INVENTION

Figure 1:
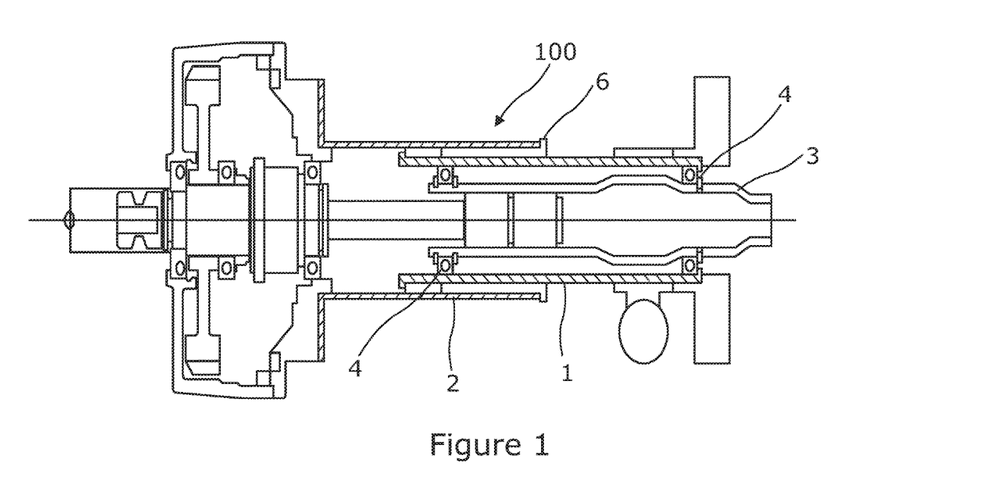
FIG. 1 is a cross sectional view of a part of an embodiment of a steering column assembly of the kind according to the present invention.
Figure 2:
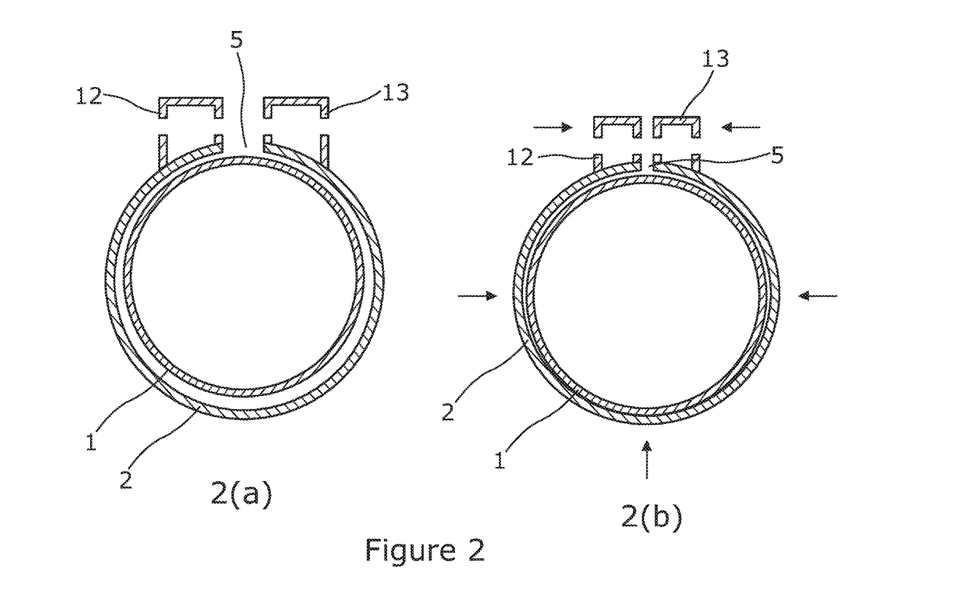
FIG. 2 is a view in section along the line A-A in FIG. 1 of the steering column assembly.

A steering column assembly 100 comprises a telescopic shroud having an upper shroud portion 1 and a lower shroud portion 2 that surround and supports a steering column shaft 3 using bearings 4 that are located within the shrouds. Each shroud portion comprises a generally cylindrical tube. The lower tube comprises a cast metal component that has a slot 5 that extends axially along an upper face from the free end 6 of the tube that faces the steering wheel over about 100 mm or so. The inner diameter of the lower shroud portion when in a relaxed state as shown in FIG. 2(a) is slightly greater than the outer diameter of the inner shroud portion so that the inner shroud portion can slide freely into and out of the outer shroud portion. In a clamp state as shown in FIG. 2(b) the slot in the outer shroud portion is closed up causing the inner diameter to reduce and the lower shroud portion to clamp onto the upper shroud portion. This removes any free play and prevents accidental movement of the upper shroud portion.

The squeezing of the lower shroud portion 2 onto the upper shroud portion 1 is achieved using a clamp mechanism 200 that can be moved between a clamped and unclamped condition using a lever or handle. The clamp mechanism, in addition to squeezing the lower shroud portion, clamps the shroud onto a support bracket 7 that is fixed to a part of the vehicle body, such as a rail located behind the dashboard.

Figures 3, 4:
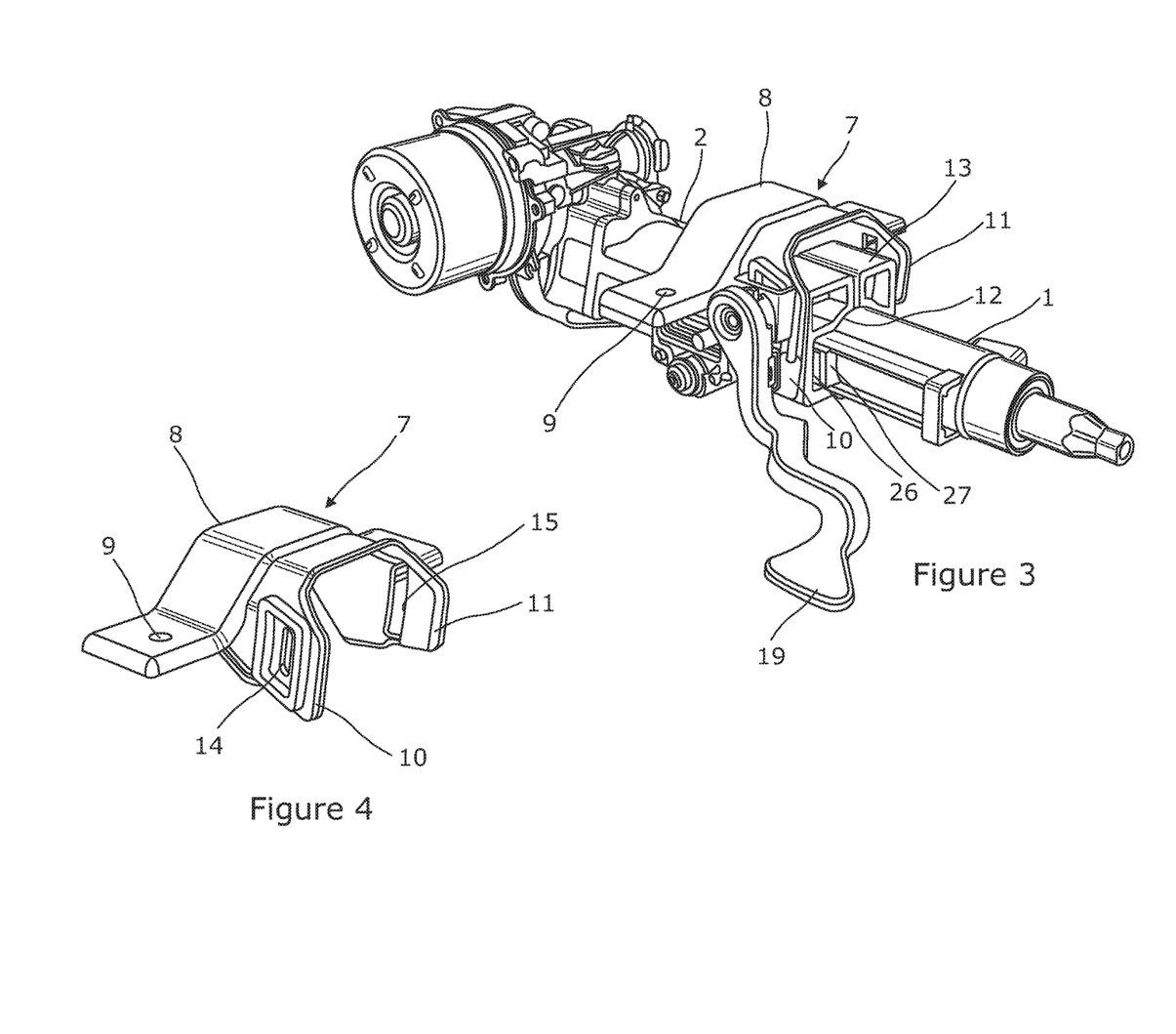
FIG. 3 is a view in perspective of the steering column assembly of FIG. 1 showing the location of a clamp mechanism and a reach locking mechanism.
FIG. 4 is a view of the support bracket of the assembly of FIG. 3.
Figure 8:
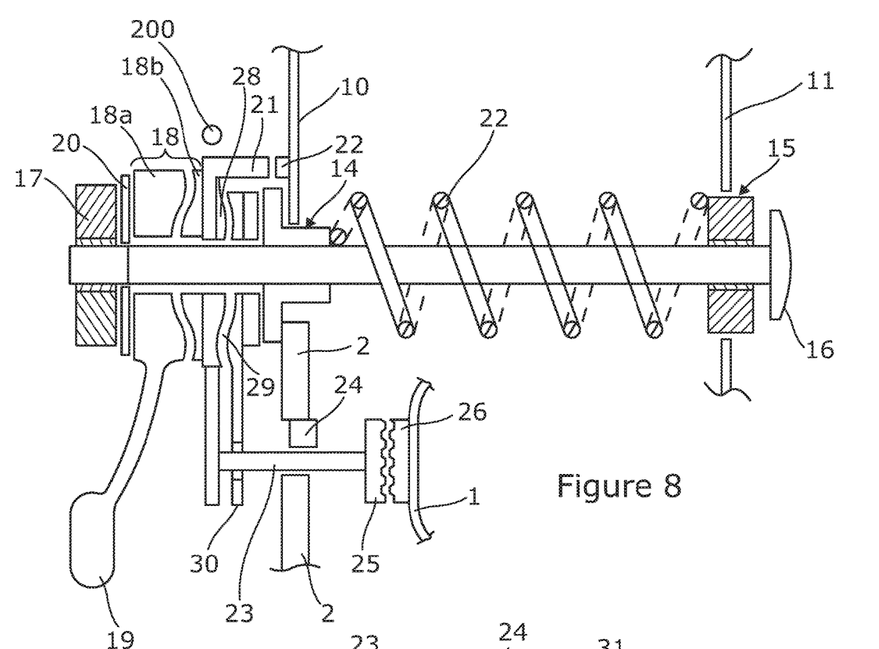
FIG. 8 is a cross sectional view of the parts shown in FIG. 5 together with the rest of the clamp mechanism.

The clamp mechanism 200 and support bracket can be seen in FIGS. 3 and 8 of the drawings. The support bracket is seen best in FIG. 4. The bracket 7 comprises a mounting plate 8 having holes 9 through which mounting bolts (not shown) can be passed that engage threaded holes in the vehicle body (also not shown). Two arms 10, 11 depend downwards from the mounting plate 8, to form an inverted U-shape in cross section, the two arms 10, 11 extending down respective sides of the lower shroud portion 2. Two rails 12, 13 are fixed to the top of the lower shroud portion 2, one on each side of the slot 5, and a side face of each rail abuts an inner face of an adjacent arm 10, 11. The rails can best be seen in FIGS. 2(a) and (b).

Figure 5:
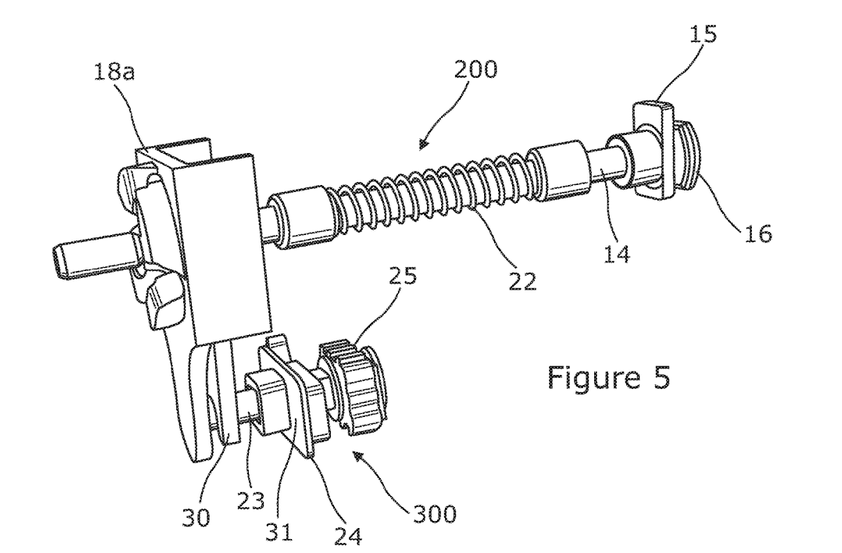
FIG. 5 is a view of the clamp mechanism and the reach locking mechanism and also a release mechanism of the embodiment of FIG. 3 which locks the shroud in position and also enables the lock to be partially released in the event of a crash.
Figures 6, 7:
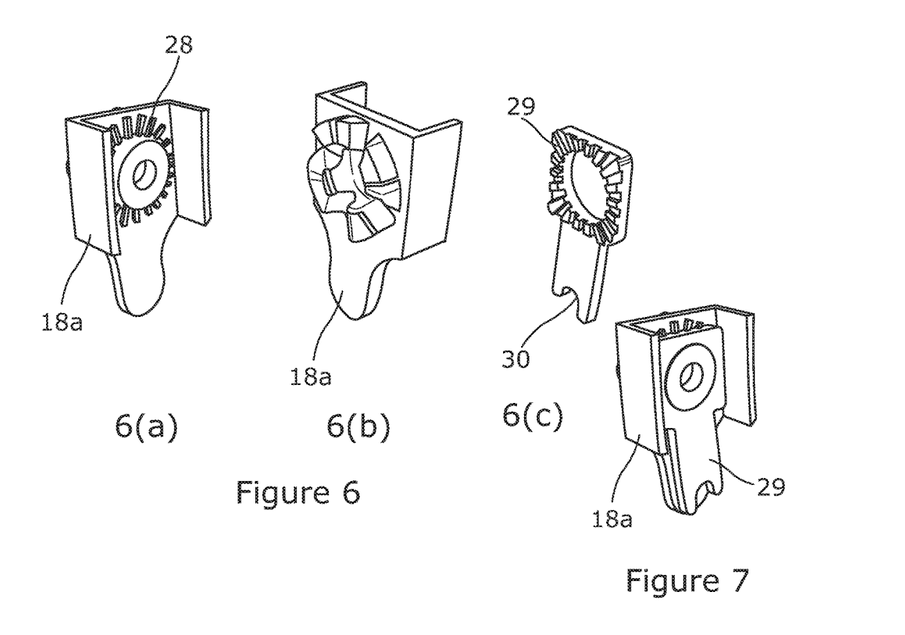
FIG. 7 shows how the parts shown in 6(a) to 6(c) fit together.

The clamp mechanism 200 as shown in FIG. 5 and in FIG. 8 is exploded view comprises a clamp pin 14 that passes through an opening 14,15 in each arm and an opening in each rail 12,13 of the lower shroud portion 2. Each end of the clamp pin 14 is provided with a thread onto which a locking nut 16, 17 is threaded although one end may be provided with a fixed head (as shown). The spacing between the nuts defines a set length of clamp pin. Threaded onto the clamp pin 14 between one arm 10 and one of the locking nuts 17 is a primary cam mechanism 18 which is operable by a lever 19 between an unclamped condition of the clamp mechanism in which the primary cam mechanism has a first length and a clamped condition in which the primary cam mechanism has a second, longer, length, whereby the clamp mechanism is arranged so that when in the clamped condition the at least one arm is clamped to the lower shroud portion or rail and the lower portion is squeezed onto the upper portion to fix the upper shroud portion relative to the lower shroud portion.

The primary cam mechanism comprises a moving cam part 18a that is secured to the locking lever 19 and is threaded onto the clamp pin so that it can rotate around the axis of the clamp pin. Note that the moving cam part 18a is omitted from FIG. 5. This abuts a thrust washer 20 that in turn abuts the locking nut. Between this moving cam part and the nearest arm of the bracket is a fixed cam part 18b. This cam part is free to move axially along the clamp pin but is prevented from rotating. Each cam part comprises a set of ramps or standoffs that abut corresponding ramps or standoffs on the other cam part. The relative angular position of the two cam parts determines the overall length of the primary cam mechanism.

Located between the fixed cam part 18b and the arm of the support bracket is a toothed block, which in this embodiment is an integral part of the fixed cam part 18a. The opening 17 in the arm through which the clamp pin passes is elongated vertically and the pin is able to move up and down in the slot. The block 20 carries teeth that engage corresponding rows of teeth 21 secured to the arm 10 of the bracket alongside the slot. A spring 22 threaded onto the clamp pin biases the toothed block away from the arm.

In use, with the primary cam mechanism 18 in an unclamped condition (shortest length), the toothed block 20 is pushed clear of the teeth on the arm. This allows the shroud to be adjusted for rake. In this condition, the lower shroud portion is not squeezed onto the upper shroud portion. When the primary cam mechanism is the clamped condition (longest length) it pushes the toothed block against the spring into engagement with the teeth on the arm. At the same time, the nut at the opposing end of the clamp pin is pulled towards that adjacent arm and the lower shroud portion is squeezed onto the upper shroud portion, closing the slot.

To provide for a positive lock of the steering column assembly for reach, the assembly also includes reach locking device 300. This can be seen in FIG. 3 to 7.

The reach locking device 300 is axially offset from the clamp pin 14 but is actuated by the same lever 19 that actuates the primary clamp mechanism.

The reach locking device 300 comprises a rod 23 that passes through an opening in a side wall of the lower shroud 2. The rod 23 is supported by a carrier 24 that has an opening of corresponding cross section to the rod so that that rod is free to slide within the opening in the carrier and thereby move axially.

The carrier 24 and rod 23 in this embodiment are located below the arm 10 of the support bracket so that the rod 23 does not pass through an opening in the support bracket, only an opening in the lower shroud portion. The axis of the rod will therefore be vertically offset from the axis of the clamp pin.

The rod 23 carries a block 25 on its end nearest the upper shroud portion which has a set of teeth that can engage complimentary set of teeth of a reach tooth plate 26 (visible in FIGS. 3 and 8) that is secured to the upper shroud portion 1.

The teeth of the block 25 provide for a positive lock of the steering column assembly for reach when engaged with the teeth of the plate 26, any force applied to the upper shroud portion along its axis being passed through the rod to the carrier and in turn to the lower shroud portion through the carrier.

The rod 23 is moved axially to lock and unlock the locking device by connecting the end of the rod 23 furthest from the block to an extension of the fixed cam 18a of the primary cam mechanism 18. As the fixed cam 18a moves axially along the clamp pin 14 the rod 23 also moves axially. The amount of movement between locked and unlocked should be sufficient to move the teeth of the head from fully engaged to fully clear of the toothed plate.

In use, with the clamp mechanism in the clamped position and the toothed block of the locking device engaged with the teeth of the plate 26, the shroud 1, 2 is positively locked for both rake and reach. Any force applied to the upper shroud portion will be resisted and the shroud will not move.

When an excessive force is applied, such as during a crash where a driver impacts on the steering wheel, the upper shroud portion 1 should be able to collapse. To enable this, the reach tooth plate 26 is secured to the upper shroud portion by a rail 27 along which it can slide. An energy absorbing mechanism connects the plate to the upper shroud portion and is arranged to deform in the event of a crash to permit the plate to move relative to the upper shroud, the movement of the plate relative to the lower shroud portion being restrained during a crash by the toothed head and pin to which it is attached that are reacted by the carrier in the opening in the lower shroud portion.

In addition to the positive reach and rake locking the embodiment of the accompanying figures includes a release mechanism that releases the clamp force of the lower shroud portion on the upper shroud portion immediately following a collapse during a crash. This will now be described.

The release mechanism comprises a secondary cam mechanism that is located in series along the clamp pin 14 with the primary cam mechanism, the secondary cam mechanism being operable between a normal position in which it has a first length and a released position in which it has a second, shorter, length, the difference in length being less than the height of the teeth of the toothed block or set of teeth.

The amount by which the clamp force will be released will be dependent, at least in part, on the change in length of the secondary cam mechanism between the normal position and the release position, and the resilience of the parts of the assembly such as the clamp pin, arms, outer shroud portion etc.

The secondary cam mechanism is located between the primary cam mechanism and the arm of the support bracket. The primary cam mechanism may therefore squeeze the secondary cam mechanism onto the arm.

The secondary cam mechanism in this embodiment comprises a fixed cam portion 28 and a moving cam portion 29, each threaded onto the clamp pin 14, the moving cam portion rotating between the normal and release position to alter the length of the secondary cam. The fixed cam portion is integrally formed with the fixed cam portion of the primary cam mechanism, and so cannot rotate but is free to move axially along the clamp pin. By moving we mean that the cam portion can rotate but cannot move axially along the clamp pin 14. The moving cam portion of the secondary cam mechanism (the one that moves axially) is threaded onto the clamp pin between the fixed cam portion and the arm 10.

The moving cam portion is connected to the rod of the locking mechanism by providing an extended arm 30 having a hole at its end that is threaded onto the rod 23.

The carrier 24 through which the rod passes is located within an elongated slot 32 in the lower shroud portion and is secured in normal use by a frangible pin 31 so that there is a small gap 33 between an edge of the carrier and the edges of the slot on the side of the carrier that faces away from the steering wheel. This pin 31 prevents the carrier moving but is designed to break if a high force is applied to the upper shroud when the locking device is locked, as would occur in a crash where a driver impacts the steering wheel.

Figure 9A:
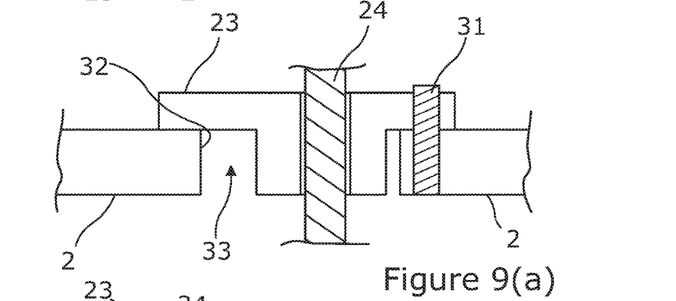
FIGS. 9(a) and (b) show the engagement of a carrier of the reach locking mechanism with the lower shroud portion both prior to a crash and immediately after when the carrier has broken free of the lower shroud portion.
Figure 9B:
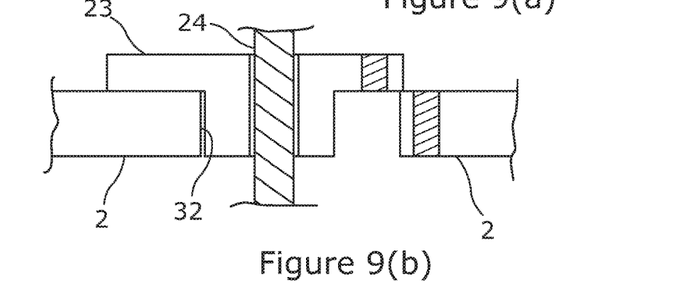

FIG. 9(a) shows the carrier in the slot prior to a crash, and FIG. 9(b) shows the carrier in the slot after a crash. As can be seen, once broken the carrier 23 moves within the slot as the upper shroud portion 1 telescopically moves into the lower shroud portion until the gap 33 is closed and the carrier 23 strikes a side wall of the slot, which prevents any further movement. The lower shroud portion then resists any further attempt by the rod to move.

This small movement of the carrier and hence the rod 23 causes the extension 30 of the moving cam of the release mechanism to rotate and this changes the length of the cam, releasing partially the clamp force. The profile of each cam face of the secondary cam pair is a series of radial up-stands of approximately 1 mm height (to be confirmed) which initially overlap. When relatively rotated, they become misaligned and allow the main cam pair to move inwards towards the Rake Bracket by the said height. This is sufficient to release most of the tension in the Clamp Bolt but not enough to cause the teeth of the Rake and Reach positive-locking teeth to disengage.

The invention claimed is:

1. A steering column assembly comprising:
a telescopic shroud having an upper shroud portion and a lower shroud portion, in which at least part of the upper shroud portion is telescopically received within the lower shroud portion,
a support bracket which in use is secured to a fixed part of a vehicle, the bracket having at least one arm which extends down from the bracket on one side of the lower shroud portion,
a clamp mechanism which comprises a clamp pin that passes through an opening in the at least one arm and an opening in the lower shroud portion or an opening in a rail secured to the lower shroud portion,
the clamp mechanism further comprising a primary cam mechanism which is operable by a lever between an unclamped condition of the clamp mechanism in which the primary cam mechanism has a first length and a clamped condition in which the primary cam mechanism has a second, longer, length, whereby the clamp mechanism is arranged so that when in the clamped condition the at least one arm is clamped to the lower shroud portion or the rail and the lower shroud portion is squeezed onto the upper shroud portion to fix the upper shroud portion relative to the lower shroud portion,
wherein a release mechanism which is operable to partially reduce a force with which the lower shroud portion is squeezed onto the upper shroud portion in the event of a crash that causes the upper portion to move into the lower portion whilst the clamp mechanism is in the clamped position.

2. A steering column assembly according to claim 1 in which the opening in the at least one arm through which the clamp pin of the primary clamp mechanism passes comprises an elongate slot that extends generally vertically, movement of the clamp pin up or down along the slot when in the unclamped condition permitting rake adjustment of the assembly.

3. A steering column assembly according to claim 2 in which the clamp mechanism further includes one or more teeth secured to the bracket and one or more teeth that are moved by the clamp mechanism into and out of engagement with those teeth when in the clamped or unclamped condition respectively to provide positive locking, the release mechanism releasing the clamping of the lower shroud portion to the upper shroud portion but maintaining the teeth at least partially in engagement so as to retain the positive locking when released.

4. A steering column assembly according to claim 3 in which the release mechanism comprises a secondary cam mechanism that is located in series along the clamp pin with the primary cam mechanism, the secondary cam mechanism being operable between a normal position in which the secondary cam mechanism has a first length and a released position in which the secondary cam mechanism has a second, shorter, length, the difference in length being less than a height of the teeth.

5. A steering column assembly according to claim 4 in which the secondary cam mechanism is located between the primary cam mechanism and the at least one arm of the support bracket.

6. A steering column assembly according to claim 5 in which the secondary cam mechanism comprises a fixed cam portion and a moving cam portion, each threaded onto the clamp pin, the moving cam portion rotating between the normal and release position to alter the length of the secondary cam.

7. A steering column assembly according to claim 4 in which the moving cam portion of the secondary cam mechanism is connected to the upper shroud portion through an actuating mechanism such that movement of the upper shroud portion relative to the lower shroud portion causes movement of the actuating mechanism and in turn the rotational movement of the secondary cam mechanism to the release condition.

8. A steering column assembly according to claim 7 in which the actuating mechanism includes an extension arm that projects from the moving portion of the secondary cam mechanism, the extension arm rotating around the axis of the clamp pin to cause rotation of the moving cam portion.

9. A steering column assembly according to claim 8 in which the actuating mechanism includes a carrier that is connected to the extension arm and is located within an opening in the lower shroud portion through which a reach locking device extends that engages the upper shroud portion when the steering column assembly is in the clamped condition, the carrier being arranged so that the carrier can move relative to the opening when a force is applied to the locking device in a direction parallel to the telescopic movement of the shroud that exceeds a predefined value, thereby creating movement of the extension arm that in turn releases the release mechanism.

10. A steering column assembly according to claim 9 in which the carrier is located in the opening by one or more deformable or frangible connectors that resist movement of the carrier relative to the opening until the force is applied that deforms or breaks the connectors.

11. A steering column assembly according to claim 9 in which the reach locking device is arranged so that the reach locking device is spaced apart from the upper shroud portion when the clamp mechanism is in the unclamped condition and engages the upper shroud portion when the clamp mechanism is in the clamped condition.

12. A steering column according to claim 9 in which the reach locking device is actuated directly by the clamp mechanism.

13. A steering column assembly according to claim 9 in which the reach locking device comprises a rod that passes through an opening in the carrier and thereby through the opening in the lower shroud portion, the rod being free to slide within the opening in the carrier so that the rod can move axially in response to movement of the fixed portion of the primary clamp mechanism along the axis of the clamp pin, and in which an end of the rod is fixed to an extension of the fixed cam portion of the primary cam mechanism that extends generally radially away from the axis of the clamp pin.

14. A steering column assembly according to claim 13 in which the rod carries a block on its end nearest the upper shroud portion which has a set of teeth that can engage complimentary set of teeth of a reach tooth plate that is secured to the upper shroud portion.

15. A steering column assembly according to claim 14 in which the reach tooth plate is secured to the upper shroud portion by a rail along which it can slide and an energy absorbing mechanism that connects the reach tooth plate to the upper shroud portion that is arranged to deform in the event of a crash to permit the reach tooth plate to move relative to the upper shroud portion, the movement of the reach tooth plate relative to the lower shroud portion being restrained during a crash by a toothed head and pin to which it is attached that are reacted by the carrier in the opening in the lower shroud portion.

* * * * *